(12) United States Patent
Takeuchi et al.

(10) Patent No.: US 11,281,947 B2
(45) Date of Patent: Mar. 22, 2022

(54) IMAGE PROCESSING DEVICE, PRINTING APPARATUS, AND IMAGE PROCESSING METHOD

(71) Applicant: SEIKO EPSON CORPORATION, Tokyo (JP)

(72) Inventors: Yasutoshi Takeuchi, Nagano (JP); Masaya Usui, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/133,756

(22) Filed: Dec. 24, 2020

(65) Prior Publication Data

US 2021/0201095 A1 Jul. 1, 2021

(30) Foreign Application Priority Data

Dec. 26, 2019 (JP) .............................. JP2019-235430

(51) Int. Cl.
*G06K 15/02* (2006.01)
*G06K 1/12* (2006.01)
*G06F 3/12* (2006.01)

(52) U.S. Cl.
CPC ......... *G06K 15/1843* (2013.01); *G06K 1/121* (2013.01); *G06K 15/1822* (2013.01)

(58) Field of Classification Search
None
See application file for complete search history.

(56) References Cited

U.S. PATENT DOCUMENTS

| 5,184,005 A * | 2/1993 | Ukai | G06K 7/10881 235/462.16 |
| 5,270,525 A * | 12/1993 | Ukai | G06K 7/10881 235/462.16 |
| 6,357,660 B1 * | 3/2002 | Watanabe | G06K 7/14 235/462.16 |
| 2004/0164159 A1 * | 8/2004 | Iwaguchi | G06K 7/14 235/462.16 |
| 2004/0164161 A1 * | 8/2004 | Iwaguchi | G06K 7/14 235/462.16 |

(Continued)

FOREIGN PATENT DOCUMENTS

JP H06325197 * 11/1994 ............... G06K 7/10
JP 2009-193428 A 8/2009

(Continued)

*Primary Examiner* — Beniyam Menberu
(74) *Attorney, Agent, or Firm* — Global IP Counselors, LLP

(57) ABSTRACT

An image processing device configured to generate printing image data used during printing from input image data including a bar code constituted by a bar element and a space element that are a plurality of elements arranged based on a predetermined standard, includes a frequency distribution calculation unit configured to acquire widths of the plurality of elements respectively to calculate a frequency distribution of the widths of the plurality of elements, a standard width determination unit configured to determine a standard width of the plurality of elements of the barcode in the printing image data using the frequency distribution, and a correction unit configured to correct the widths of the plurality of elements of the barcode in the printing image data to the standard width.

6 Claims, 9 Drawing Sheets

(56) References Cited

U.S. PATENT DOCUMENTS

| | | | | |
|---|---|---|---|---|
| 2005/0023355 A1* | 2/2005 | Barrus | ............... | G06K 1/18 |
| | | | | 235/462.15 |
| 2008/0304891 A1* | 12/2008 | Saijo | ............... | G06K 1/121 |
| | | | | 400/76 |
| 2009/0001167 A1* | 1/2009 | Usuba | ............... | G06K 7/10 |
| | | | | 235/462.16 |

FOREIGN PATENT DOCUMENTS

| JP | 2010-089412 A | 4/2010 |
|---|---|---|
| JP | 2011-084039 A | 4/2011 |

\* cited by examiner

S220

STANDARD WIDTH OF NARROW ELEMENT: 3
STANDARD WIDTH OF WIDE ELEMENT: 6

IMAGE PROCESSING DEVICE, PRINTING APPARATUS, AND IMAGE PROCESSING METHOD

The present application is based on, and claims priority from JP Application Serial Number 2019-235430, filed Dec. 26, 2019, the disclosure of which is hereby incorporated by reference herein in its entirety.

BACKGROUND

1. Technical Field

The present disclosure relates to an image processing device, a printing apparatus, and an image processing method.

2. Related Art

In the one-dimensional barcode, a plurality of strip-shaped bars and spaces are arranged in parallel based on a predetermined standard. If the widths of the bars or spaces do not comply with a predetermined standard, the reading accuracy of the barcode decreases. For example, in JP-A-2011-84039, a line width of a bar is finely corrected and printed such that the line width of the bar satisfies the standard.

However, in JP-A-2011-84039, when the widths of the bars and spaces are varied, it is not taken into consideration to correct them and correct the barcode according to the standard.

SUMMARY

According to a first mode of the present disclosure, an image processing device configured to generate printing image data used during printing, from input image data including a barcode constituted by a bar element and a space element that are a plurality of elements arranged based on a predetermined standard is provided. The image processing device includes a frequency distribution calculation unit configured to respectively acquire widths of the plurality of elements of the barcode, and calculate a frequency distribution of the widths of the plurality of elements, a standard width determination unit configured to determine a standard width of the plurality of elements of the barcode in the print image data, and a correction unit configured to correct the widths of the plurality of elements of the barcode in the printing image data to the standard width.

According to a second aspect of the present disclosure, a printing apparatus is provided. The printing apparatus includes an image processing device according to the first mode, and a printing unit configured to print using print data that is generated from the printing image data with the widths of the plurality of elements of the barcode corrected, and that represents presence or absence of dot formation during printing.

According to a third mode of the present disclosure, an image processing method for generating printing image data used during printing from input image data including a barcode constituted by a bar element and a space element that are a plurality of elements arranged based on a predetermined standard is provided. The image processing method includes respectively acquiring widths of the plurality of elements of the barcode to calculate a frequency distribution of the widths of the plurality of elements, determining a standard width of the plurality of elements of the barcode in the printing image data using the frequency distribution, and correcting the widths of the plurality of elements of the barcode in the printing image data to the standard width.

DESCRIPTION OF EXEMPLARY EMBODIMENTS

A. First Embodiment

Figure 1:
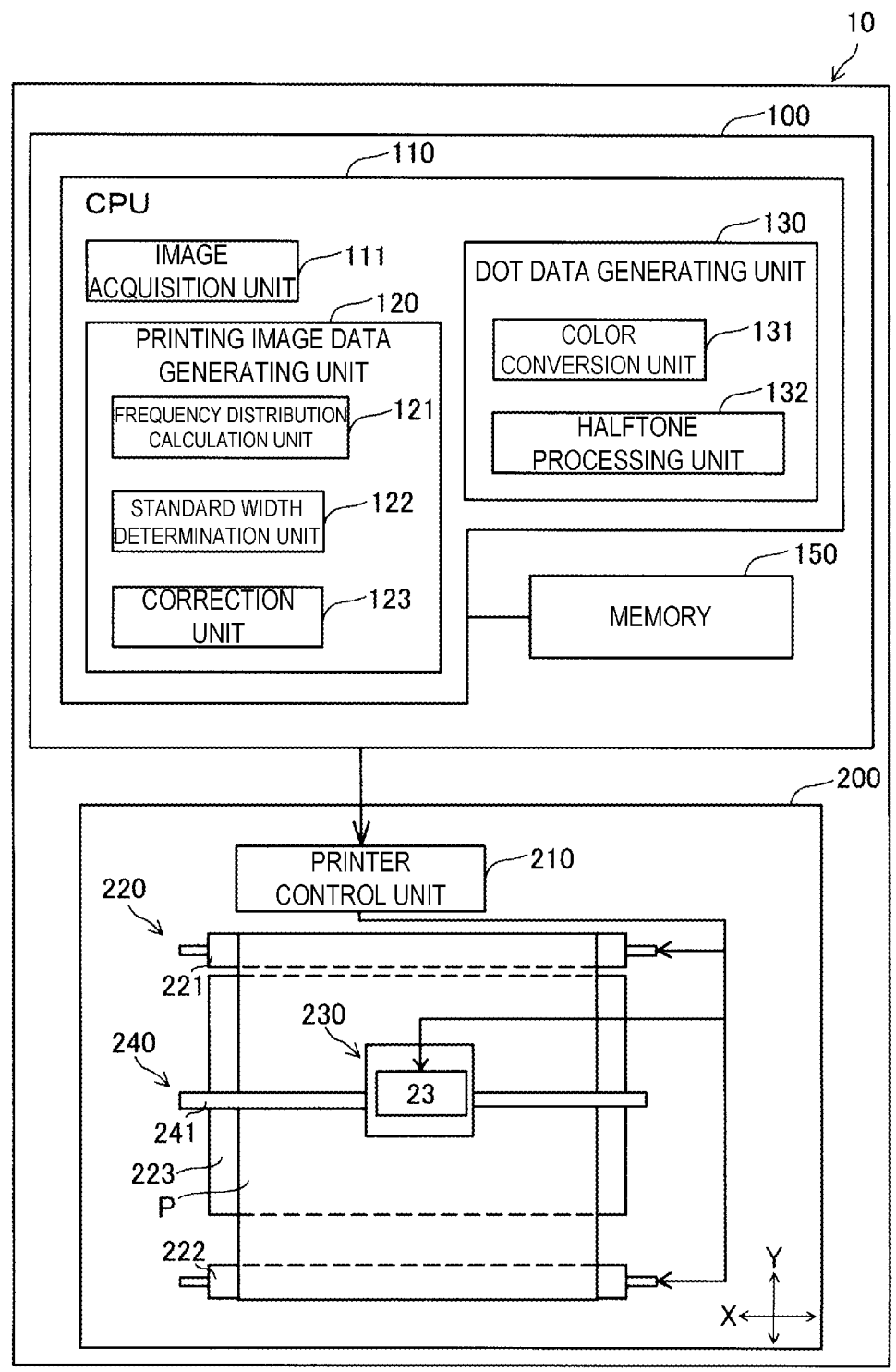
FIG. 1 is a diagram illustrating a schematic configuration of a printing system according to an embodiment of the present disclosure.

FIG. 1 is a diagram illustrating a schematic configuration of a printing system 10 according to an embodiment of the present disclosure. The printing system 10 according to this first embodiment includes an image processing device 100 and a printer 200 that actually prints an image under the control of the image processing device 100. The printing system 10 comprehensively functions as a printing apparatus in a broad sense.

The printer 200 includes a printer control unit 210, a transporting unit 220, a carriage moving unit 240, and carriage 230 including a printing head 23.

The printer control unit 210 is configured to be a computer including a CPU, a memory, and an input/output interface, and controls the transporting unit 220, the carriage moving unit 240, and the printing head 23 based on print data received from the image processing device 100. Note that the printer control unit 210 corresponds to a subordinate concept of a "printing unit" in the present disclosure.

The transporting unit 220 includes a supplying roller 221 around which a printing medium P is wound in a roller shape, a storing roller 222 that stores the transported printing medium P in a roller shape, and a platen 223 that supports the printing medium P. The transporting unit 220 transports the printing medium P from the supplying roller 221 to the storing roller 222 and moves the printing medium P in a sub-scanning direction Y under the control of the printer control unit 210.

The carriage moving unit 240 includes a carriage guide shaft 241 and a carriage motor (not illustrated). The carriage guide shaft 241 is disposed along a main scanning direction X intersecting the sub-scanning direction Y, and the two end portions of the carriage guide shaft 241 are fixed to a housing of the printer 200. The main scanning direction X is also a width direction of the printing medium P. The carriage 230 is attached to the carriage guide shaft 241 such that the carriage 230 is reciprocatable in the main scanning direction X. The carriage moving unit 240 drives the carriage motor and reciprocates the carriage 230 along the main scanning direction X, under the control of the printer control unit 210.

The printing head 23 provided in the carriage 230 discharges ink droplets onto the printing medium P to form dots under the control of the printer control unit 210.

With the above-described configuration, the printer control unit 210 instructs the conveying unit 220 to transport the printing medium P in the sub-scanning direction Y, the carriage moving unit 240 to transport the printing head 23 disposed in the carriage 230 in the main scanning direction X, and discharge ink from the nozzles of the printing head 23 to form dots, to print an image on the printing medium P.

The image processing device 100 is configured to be a computer including a CPU 110, a memory 150, and an input/output interface (not illustrated). A printing processing program (not illustrated) is stored in the memory 150.

The CPU 110 loads and executes the printing process program stored in the memory 150, to function as an image acquisition unit 111, a printing image data generating unit 120, and a dot data generating unit 130. Note that the printing image data generating unit 120 includes a frequency distribution calculation unit 121, a standard width determination unit 122, and a correction unit 123. The dot data generating unit 130 includes a color converting unit 131 and a halftone processing unit 132. The functions of these components and printing processing executed by the printing system 10 will be described.

Figure 2:
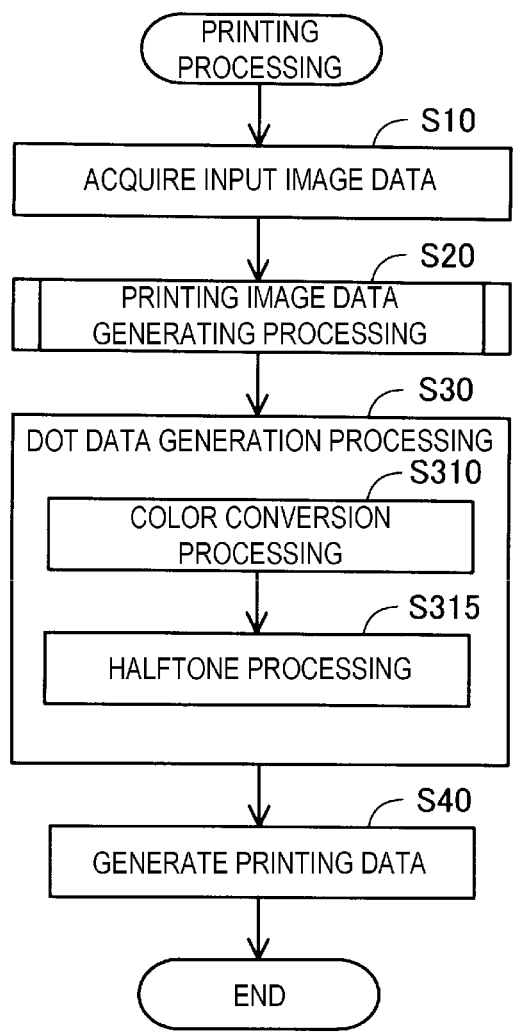
FIG. 2 is a flowchart illustrating a process procedure of printing processing.

FIG. 2 is a flowchart illustrating a process procedure of the printing processing. When a print instruction for instructing image data in the image processing device 100 is performed by a user, the printing processing is executed. In step S10, the image acquiring unit 111 acquires input image data from the memory 150. In the first embodiment, the image data has an RGB format.

Figure 3:
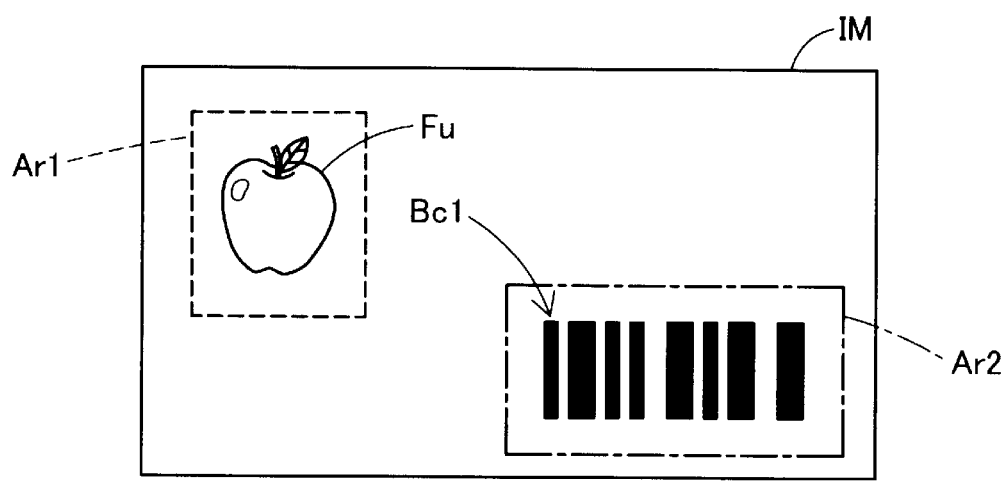
FIG. 3 is an explanatory diagram schematically illustrating an example of an input image.

FIG. 3 is an explanatory diagram schematically illustrating an example of an input image IM. The input image IM of the first embodiment is an image including a silent image Fu and a barcode Bc1. In the input image IM, the image Fu is represented in a region Ar1 surrounded by a dashed line, and the barcode Bc1 is represented in a region Ar2 surrounded by a dot-dash line. The barcode Bc1 is configured based on a predetermined standard, and in the first embodiment, the barcode B1 is configured by a standard called a binary width symbol system.

Figure 4:
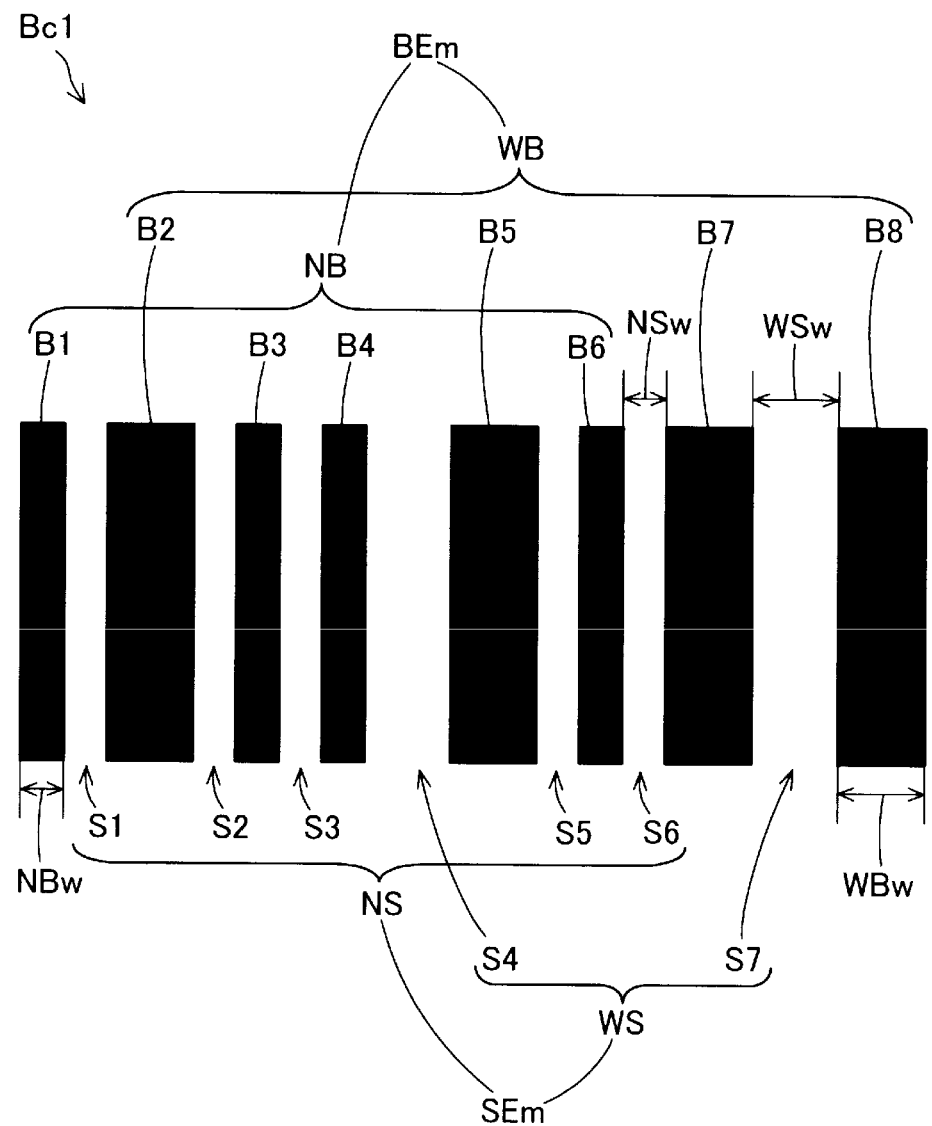
FIG. 4 is an explanatory diagram illustrating a configuration of a barcode.

FIG. 4 is an explanatory diagram illustrating a configuration of the barcode Bc1. The barcode Bc1 is configured by a bar element BEm and a space element SEm that are a plurality of elements. The bar element BEm includes a narrow bar element Nb, which has a narrow width and is represented by black, and a wide bar element WB, which has a wide width and is represented by black. Among the bar elements BEm, the bar elements B1, B3, B4, and B6 correspond to the narrow bar element Nb, and the bar elements B2, B5, B7, and B8 correspond to the wide bar element WB.

The space elements SEm are a gaps between each two of the bar elements B1, B2, B3, B4, B5 B6, B7, and B8, and includes a narrow space element NS having a narrow width and a wide space element WS having a wide width. Among the space elements SEm, the space elements S1, S2, S3, S5, and S6 correspond to the narrow space element NS, and the space elements S4 and S7 correspond to the wide space element WS. Note that the narrow bar element Nb and the narrow space element NS are referred to as the "narrow element". The wide bar element WB and the wide element WS are referred to as the "wide element".

The width of the narrow element and the width of the wide element are defined to have a predetermined ratio relationship. In the first embodiment, the width of the narrow element:the width of the wide element=1:2. Therefore, a width NBw of the narrow bar element Nb and a width NSw of the narrow space element NS are the same width, a width WBw of the wide bar element WB and a width WSw of the wide space element WS are the same width, the width NBw of the narrow bar element NB:the width WBw of the wide bar element WB=1:2, and the width NSw of the narrow space element NS:the width WSw of the wide space element WS=1:2. The width of each element is also referred to as the "element width".

Returning to FIG. 2, in step S20, the printing image data generating unit 120 executes the printing image data generation processing.

Figure 5:
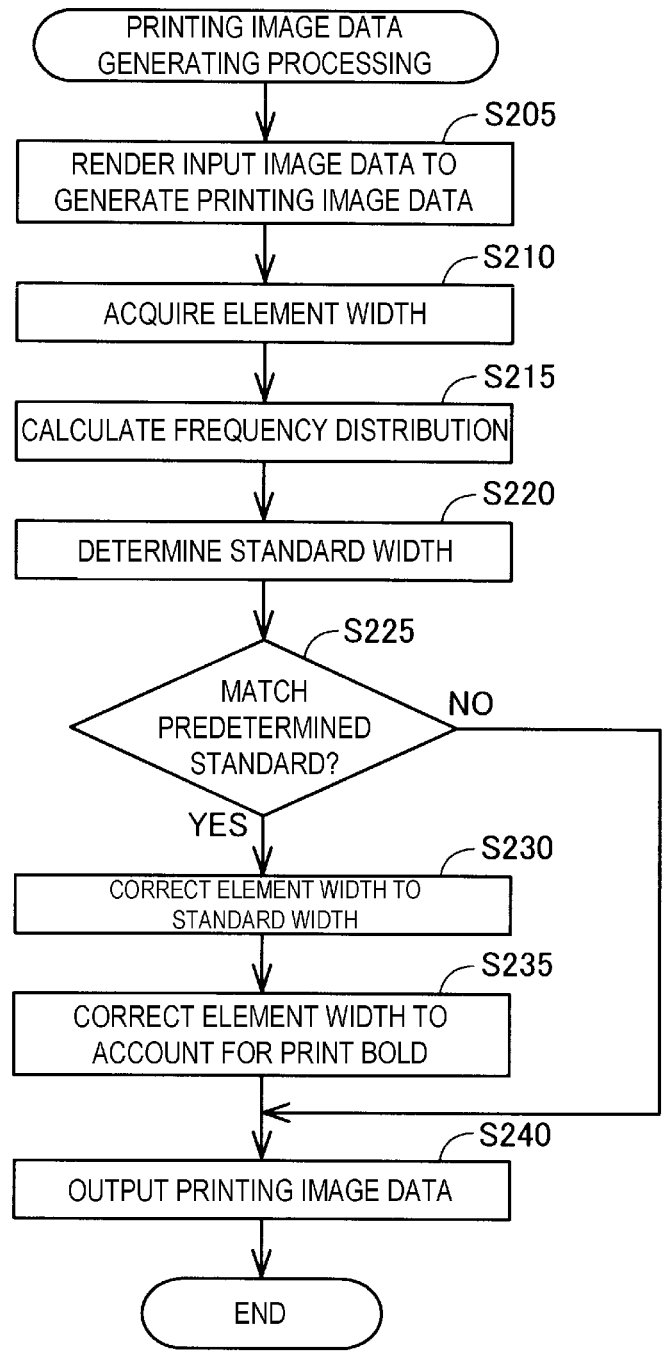
FIG. 5 is a flowchart illustrating a process procedure of printing image data generating processing.
Figure 6:
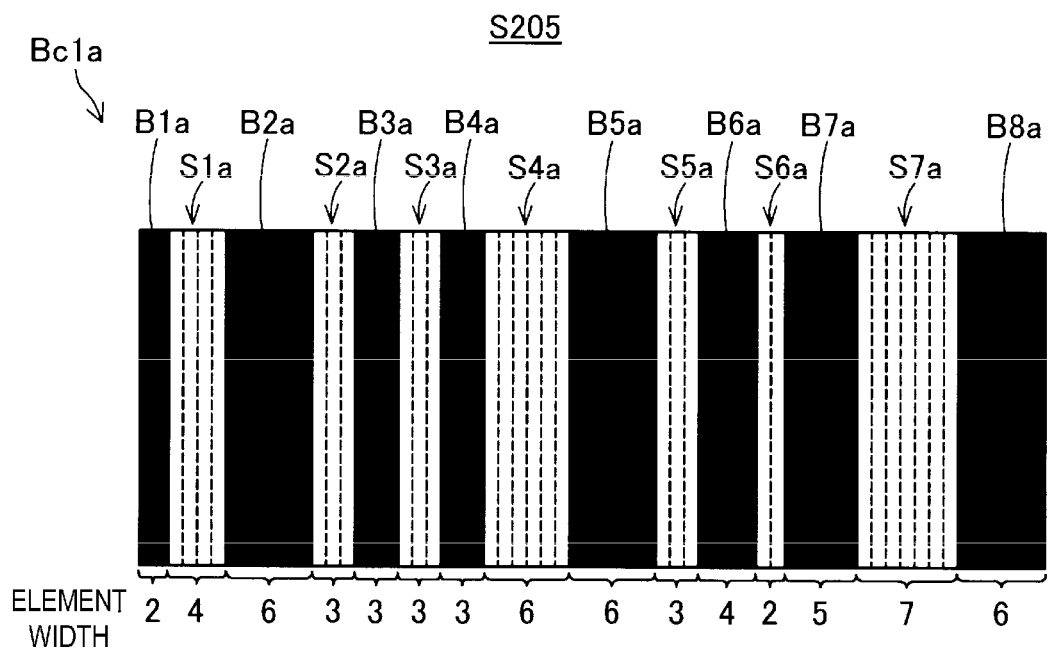
FIG. 6 is an explanatory diagram schematically illustrating a state in which the printing image data generating processing is executed.
Figure 7:
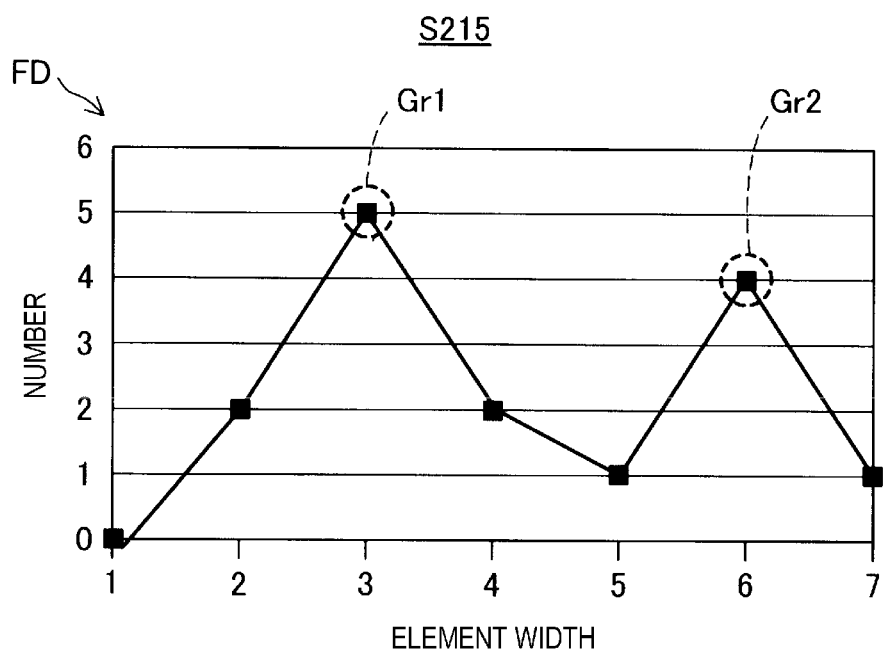
FIG. 7 is an explanatory diagram schematically illustrating a state in which the printing image data generating processing is executed.
Figure 7:
Figure 7:
Figure 8:
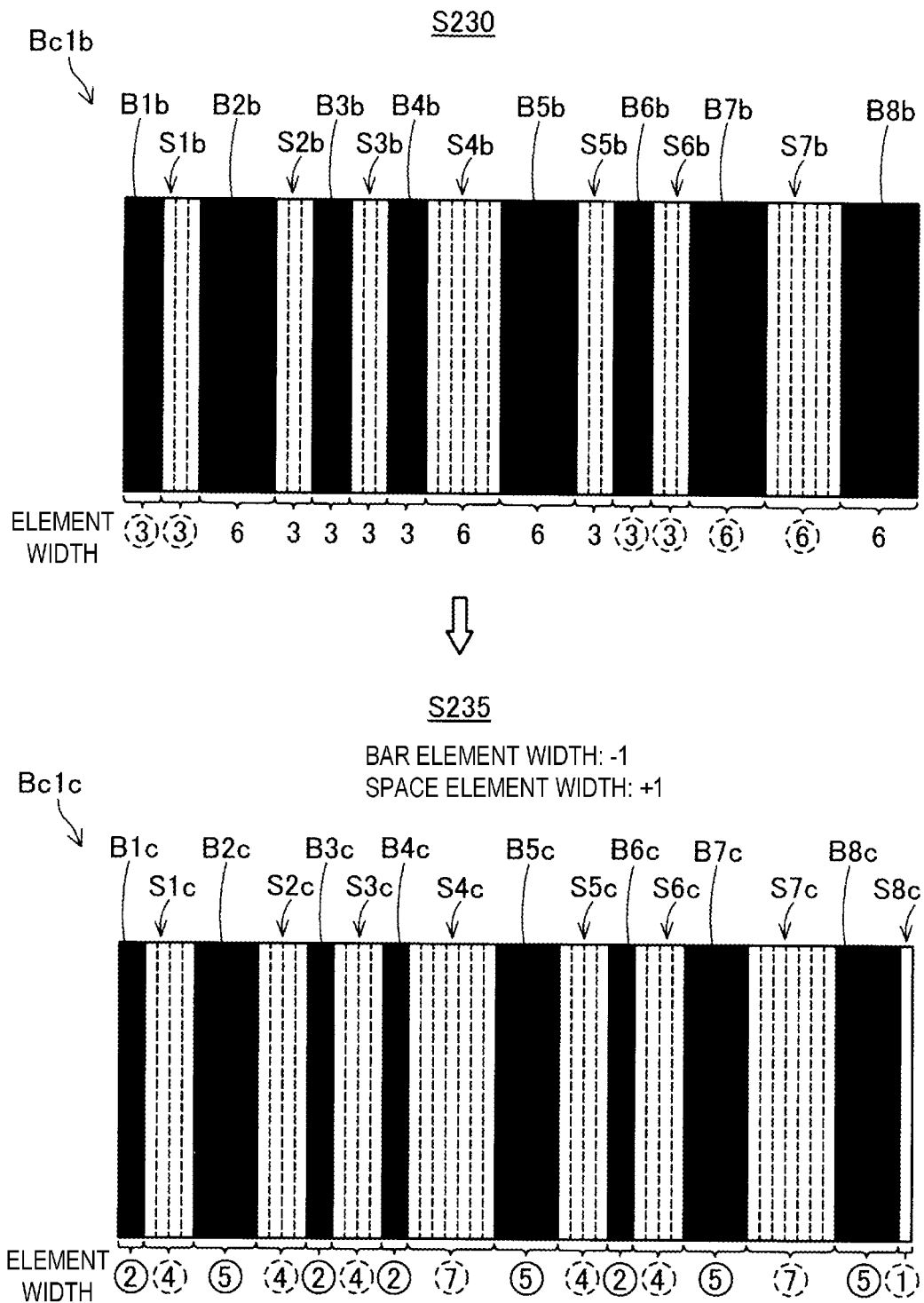
FIG. 8 is an explanatory diagram schematically illustrating a state in which the printing image data generating processing is executed.

FIG. 5 is a flowchart illustrating a process procedure of the printing image data generating processing. FIG. 6, FIG. 7, and FIG. 8 are explanatory diagrams schematically illustrating a state in which the printing image data generating processing is executed. As illustrated in FIG. 5, in step S205, the printing image data generating unit 120 renders the input image data, which is a vector image, and generates the printing image data, which is a raster image. In the first embodiment, each pixel constituting the printing image data is recorded in each gray scale value data of red, green, and blue. The print image data generating unit 120 converts each element width of the barcode Bc1 into a number of dots, corresponding to a resolution for printing by the printer 200.

A barcode Bc1a in the printing image data generated in step S205 is illustrated at the top part of FIG. 6. The element width of each element is illustrated below the barcode Bc1a. In the barcode Bc1a in the printing image data, the respective element widths of the respective narrow elements and the respective wide elements are not uniform, and the element widths of some elements do not satisfy the above-described ratio relationship. This is because the number of dots, which is the element width in the printing image data, may not be uniquely determined with respect to the element width in the input image data during the rendering, depending on the designation of a size of the input image IM.

In the barcode Bc1a, for example, the element width of the narrow bar element B1a and the narrow element S6a is "2", while the element width of the narrow element S2a and the narrow bar element B3a is "3", the respective element widths of the narrow elements are not uniform. In addition, for example, the element width of the wide bar element B2a and the wide space element S4a is "6", while the element width of the wide bar element B7a is "5", the element width of the wide space element S7a is "7", the respective element widths of the wide elements are not uniform. In addition, for example, the ratio relationship described above is satisfied between the narrow bar element B1a and the wide space element S1a, while the ratio relationship described above is not satisfied between the narrow bar element B1a and the wide bar element B2a. Thus, when printing is performed using such printing image data, a barcode with a variation in element width will be printed. Thus, as described below, the printing image data generating unit 120 corrects the element width of the barcode Bc1a in the printing image data.

Returning to FIG. 5, in step S210, the frequency distribution calculation unit 121 acquires the respective element widths of the barcode Bc1a in the printing image data. Specifically, the frequency distribution calculating unit 121 calculates the respective element widths of the bar elements B1a, B2a, B3a, B4a, B5a, B6a, B7a and B8a and the space elements S1a, S2a, S3a, S4a, S5a, S6a and S7a, and counts the number of elements per element width. For example, the results illustrated in the bottom part of FIG. 6 are obtained.

Returning to FIG. 5, in step S215, the frequency distribution calculation unit 121 calculates the frequency distribution of the element widths. In frequency distribution FD illustrated in the top part of FIG. 7, the horizontal axis indicates the element width, and the vertical axis indicates the number. The frequency distribution FD indicates a distribution having two peak maximum values. Specifically, the frequency distribution FD has a maximum value Gr1 at the element width "3" and has a maximum value Gr2 at the element width "6".

Returning to FIG. 5, at step S220, the standard width determination unit 122 uses the frequency distribution FD to determine a standard width of each element of the barcode Bc1a in the printing image data. In the first embodiment, the standard width determination unit 122 sets the element widths of the maximum values Gr1 and Gr2 in the frequency distribution FD as the standard width. Thus, as illustrated in the bottom part of FIG. 7, the standard width of the narrow element is determined to be the element width "3" and the standard width of the wide element is determined to be the element width "6".

Returning to FIG. 5, in step S225, the correction unit 123 determines whether the standard width determined by the standard width determination unit 122 matches a predetermined standard. Specifically, the correction unit 123 determines whether the standard width of the narrow element:the standard width of the wide element=1:2. When the standard width of the narrow element:the standard width of the wide element=1:2, the correction unit 123 determines that the standard width matches the predetermined standard (S225: YES), and in step S230, the correction unit 123 corrects the width of each element of the barcode Bc1a in data for the printed image, to the standard width. Specifically, the correction unit 123 sets, for each the elements, a standard width having a value closer to the current element width of the two determined standard widths, to the element width.

A barcode Bc1b corrected in step S230 is illustrated in the top part of FIG. 8. The element width of each element is illustrated below the barcode Bc1b, and the element width corrected to the standard width is indicated by a dashed circle. As can be understood in comparison to the barcode Bc1a illustrated in FIG. 6 and the barcode Bc1b illustrated in FIG. 8, the element B1a and the element Sha having an element width of "2" and the elements S1a and the element B6a having an element width of "4" are corrected to the standard width "3" of the narrow element. Further, each element width of the element B7a having the element width of "5" as well as the element S7a having the element width of "7" are corrected to the standard width "6" of the wide element. Thus, in the barcode Bc1b in the printing image data, the element width of each of the narrow elements is unified the standard width "3", and the element width of each of the wide elements is unified to the standard width "6", so that the above-described ratio relationship is established for all elements.

Returning to FIG. 5, in step S235, the correction unit 123 corrects each element width of the barcode Bc1b in the data for the printed image in consideration of the thickness due to the dot gain during printing. Specifically, the correction unit 123 reduces the width of the bar element by one dot. At this time, the correction unit 123 reduces the width from the right side of the sheet, which is a tail side of the bar element, toward the left side of the sheet, which is a tip side of the bar element. Thus, the width of the space element adjacent to the bar element on the tail side increases by one dot on the tip side. By performing such correction, the increase in the width of the bar element due to the ink bleed-through at the edge portion of the bar element can be suppressed. As a result, the decrease in the width of the space element due to the increase in the width of the bar element can be suppressed.

A barcode Bc1c corrected in step S235 is illustrated in the lower row of FIG. 8. The element width of each element is illustrated below the barcode Bc1c, the element width of the bar element is indicated by a solid circle, and the element width of the space element is indicated by a dashed circle. For example, the bar element Bic illustrated in the lower row of FIG. 8 is obtained by a correction that reduces one dot on the tail side of the bar element B1b illustrated in the upper row of FIG. 8, and the element width is reduced by one dot. Additionally, with such correction, one dot is added to the tip side of the space element S1b illustrated in the upper row of FIG. 8 to obtain the space element S1c illustrated in the lower row of FIG. 8. Note that, as a method for correcting the element width in consideration of the width gain due to the dot gain during printing, it is possible to use a technique for reducing the density of a single dot pixel on the tail side of the bar element. Further, step S235 may be omitted. For example, when a barcode is printed by a laser printer, there is little width gain due to the dot gain, thus the process of step S235 is not necessary.

Returning to FIG. 5, after the execution of step S235, in step S240, the printing image data generating unit 120 outputs the printing image data.

When it is determined in the above-described step S225 that the standard width does not match the predetermined standard (step S225: NO), the above-described step S240 is executed. That is, when the standard width does not match the predetermined standard, the element width of the barcode Bc1a in the printing image data is not corrected. After the execution of step S240, the printing image data generating processing ends, and step S30 illustrated in FIG. 2 is executed. Note that, when it is determined that the standard width does not match the predetermined standard (step S225: NO), an error may be issued and the printing image data generating processing may be stopped.

In step S30, the dot data generating unit 130 executes the dot data generating processing. Dot data indicates recording states of dots corresponding to image data for forming multiple dots at the printing medium P. The dot data generating processing includes a color conversion processing and a halftone processing.

In step S310, the color converting unit 131 executes the color conversion processing, and uses a look-up table (not illustrated) stored in the memory 150 in advance to convert RGB format data into data of ink amount in a CMYK color system.

In step S315, the halftone processor 132 executes the halftone processing, and uses a dot recording rate table (not illustrated) stored in the memory 150 in advance to convert the data of ink amount of each ink color into dot data including combinations of three types of dots of small, medium, and large. As a method for converting the dot recording rate into dot data, any arbitrary halftone method such as an error diffusion method or a dither method can be used.

In step S40, the CPU 110 generates the print data and outputs the print data to the printer 200. In detail, the CPU 110 performs a rasterizing process to break down the dot data generated in the halftone processing into the dot data for each main scanning pass. The CPU 110 adds a print control command to the rasterized data to generate print data and outputs the print data to the printer 200. The printer control unit 210 prints an image on the printing medium P based on the output print data. The print control command includes, for example, information involving the type of printing medium P and conveying data involving the conveying distance and speed of the printing medium P in the sub-scanning direction Y during a single sub-scanning motion. Note that, the information involving the type of printing medium P may be output to the printer 200 separately from the print control command.

According to the first embodiment described above, the frequency distribution FD of the widths of the plurality of elements is used to determine the standard width of the plurality of elements of the barcode Bc1a in the printing image data, and the width of the plurality of elements of the barcode Bc1a in the printing image data is corrected to the standard width, thus, a variation in the width of the element of the barcode Bc1b in the printing image data can be suppressed. Thus, by printing using the printing image data, the occurrence of variation in the width of the bar element and the space element in the barcode can be suppressed even in the printing result.

According to the first embodiment, when the standard width does not match the predetermined standard, the correction of the barcode Bc1a in the printing image data is not executed, thus the decrease in the read accuracy of the printed barcode can be suppressed.

According to the first embodiment, the standard width is determined using the maximum values Gr1 and Gr2 in the frequency distribution FD, and thus the standard width can be easily determined.

B. Second Embodiment

In step S230 of the first embodiment described above, the element width of the barcode Bc1a is corrected regardless of the image Fu in the input image IM illustrated in FIG. 3, but the element width may be corrected such that the ratio of the size of the image Fu to the size of the barcode Bc1 is maintained before and after correction of the element width. That is, the standard width may be determined such that the ratio of the size of the barcode Bc1 to the size of the image Fu in the input image data and the ratio of the size of the barcode Bc1b to the size of the image Fu in the printing image data are set to be the same. Note that, "the ratio of the size of the image Fu to the size of the barcode Bc1 is maintained" means that the value of the ratio in the input image data and the value of the ratio in the print data match within an acceptable range. The acceptable range is, for example, −5% to 5%.

According to the second embodiment described above, the standard width is determined such that the ratio of the size of the barcode Bc1 to the size of the image Fu in the input image data is maintained even in the printing image data, thus, a balance between the size of the barcode Bc1b and the size of the image Fu in the printing image data can be prevented being unbalanced before and after the correction of the width of the element. Further, when viewing the entire printed image, the printing result intended by the user can also be obtained.

C. Third Embodiment

Figure 9:
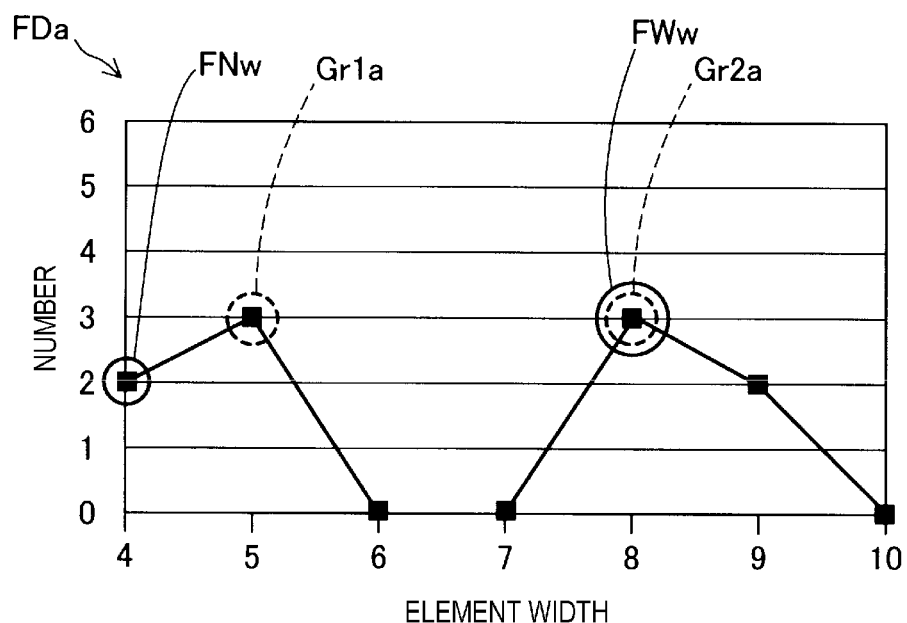
FIG. 9 is an explanatory diagram illustrating another example of frequency distribution.

FIG. 9 is an explanatory diagram illustrating another example of the frequency distribution. In a frequency distribution FDa, the horizontal axis indicates the element width, and the vertical axis indicates the number. The frequency distribution FDa indicates a distribution having two peak maximum values. The frequency distribution FDa has a maximum value Gr1a at the element width "5" and has a maximum value of Gr2a at the element width "8". In this case, when the width of each of the two maximum values Gr1a and Gr2a is determined as the standard width, the ratio of the element width is not 1:2, which is a value defined by the standard. Thus, in order to make the ratio of the element width to 1:2, instead of the maximum value Gr1a, the element width adjacent to the maximum value Gr1a, for example, the element width "4", may be determined as the standard width FNw of the narrow element, and the element width of the maximum value Gr2a may be determined as the standard width FWw of the wide element.

D. Other Embodiments (1) In each of the embodiments described above, when the standard width determined in step S220 does not match the predetermined standard, the correction of step S230 is not executed, but the correction of step S230 may be executed.

(2) In each of the embodiments described above, when the input image data is constituted by the image information obtained by reading the print medium on which the barcode Bc1 is printed by a scanner or the like, the pixel value of the bar element may be represented by a gray scale value having a lower density than black color. In this case, it is necessary to identify whether the pixel represented by the gray scale value other than black and white is a pixel constituting a bar element or a pixel constituting a space element. Thus, the barcode Bc1 may be binarized to identify the bar element BEm and the space element SEm. Further, for example, a threshold value for binarization may be designated by the user.

(3) In each of the embodiments described above, the barcode Bc1 is configured according to a standard referred to as a binary width symbol system, but may be configured according to a standard referred to as a multilevel width symbol system, for example, a 4-level width symbol system. In this case, a ratio relationship between the width of the narrow element and the width of the wide element may be the narrow bar element NB:the wide bar element WB:the narrow space element NS: the wide space element WS=1: 2:1:3.

(4) In each of the embodiments described above, the input image data is vector type data, but in the input images, only the barcode Bc may be represented in a vector type font, and the image Fu may be represented in a bitmap format.

In each of the embodiments described above, part of the configuration realized by hardware may be replaced with software, or conversely, part of the configuration realized by software may be replaced with hardware. Further, when part of the functions or the entire functions of the present disclosure is realized by the software, the software (computer program) may be provided in a form stored in a computer-readable recording medium. In the present disclosure, "computer-readable recording medium" is not limited to a portable recording medium such as a flexible disk and a CD-ROM, but includes various internal storage devices such as a RAM and a ROM and various external storage devices fixed to a computer such as a hard disk. In other words, "computer-readable recording medium" has a broad range of definition including any recording device capable of non-transitorily and fixedly storing data.

The present disclosure is not limited to the embodiments described above, and can be realized in various configurations without departing from the gist of the present disclosure. For example, appropriate replacements or combinations may be made to the technical features in the embodiments which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

E. Other Modes (1) According to a first mode of the present disclosure, an image processing device configured to generate printing image data used during printing, from input image data including a barcode constituted by a bar element and a space element that are a plurality of elements arranged based on a predetermined standard is provided. The image processing device includes a frequency distribution calculation unit configured to respectively acquire widths of the plurality of elements of the barcode, and calculate a frequency distribution of the widths of the plurality of elements, a standard width determination unit configured to determine a standard width of the plurality of elements of the barcode in the print image data, and a correction unit configured to correct the widths of the plurality of elements of the barcode in the printing image data to the standard width.

According to the image processing device of the first aspect, the frequency distribution of the widths of the plurality of elements is used to determine the standard width of the plurality of elements of the barcode in the printing image data, and the width of the plurality of elements of the barcode in the printing image data is corrected to the standard width, thus, the variation in the width of the element of the barcode in the printing image data can be suppressed. Thus, by printing using the printing image data, the occurrence of variation in the width of the bar element and the space element in the barcode can be suppressed even in the printing result.

(2) In the image processing device according to the mode described above, when the standard width does not match the predetermined standard, the correction unit may not execute correction of the barcode in the printing image data.

According to the image processing device of this aspect, when the standard width does not match the predetermined standard, the correction of the barcode in the printing image data is not executed, thus a decrease in the read accuracy of the printed barcode can be suppressed.

(3) In the image processing device according to the mode described above, the standard width determination unit may determine the standard width using a maximum value in the frequency distribution.

According to the image processing device of this aspect, the standard width is determined using the maximum value in the frequency distribution, thus the standard width can be easily determined.

(4) In the image processing device according to the mode described above, the input image data may include an image different from the barcode, and the standard width determination unit may determine the standard width such that a ratio of a size of the barcode to a size of the image in the input image data is maintained even in the printing image data.

According to the image processing device of this aspect, the standard width is determined such that the ratio of the size of the barcode to the size of the image in the input image data is maintained even in the printing image data, thus, a balance between the size of the barcode and the size of the image in the printing image data can be prevented being unbalanced before and after the correction of the width of the element. Further, when viewing the entire printed image, the printing result intended by the user can also be obtained.

Various embodiments of the present disclosure may be implemented. For example, the present disclosure may be realized in embodiments including a printing apparatus, a printing method, a printing image data generating method, a image processing method in an image processing device, a computer program for achieving the above-described device and method, and a recording medium for storing the computer program, and the like.

What is claimed is:

1. An image processing device configured to generate printing image data used during printing, from input image data including a barcode constituted by a bar element and a space element that are a plurality of elements arranged based on a predetermined standard, the image processing device comprising:
    a processor including
        a frequency distribution calculation unit configured to acquire widths of the plurality of elements of the barcode respectively, and calculate a frequency distribution of the widths of the plurality of elements;
        a standard width determination unit configured to use the frequency distribution to determine standard widths of the plurality of elements of the barcode in the printing image data, the plurality of elements including a plurality of wide elements, and a plurality of narrow elements each of which has a width that is narrower than a width of each of the wide elements, the standard widths including a standard width for the plurality of wide elements and a standard width for the plurality of narrow elements; and
    a correction unit configured to determine whether the standard widths determined by the standard width determination unit match the predetermined standard that defines a width ratio relationship between the standard width for the plurality of wide elements and the standard width for the plurality of narrow elements, and correct the widths of the plurality of elements of the barcode in the printing image data to the standard widths upon determining that the standard widths match the predetermined standard.

2. The image processing device according to claim 1, wherein
    when the standard widths do not match the predetermined standard, the correction unit does not perform correction of the barcode in the printing image data.

3. The image processing device according to claim 1, wherein
    the standard width determination unit determines the standard widths using a maximum value in the frequency distribution.

4. The image processing device according to claim 1, wherein
    the input image data includes an image different from the barcode, and the standard width determination unit determines the standard widths such that a ratio of a size of the barcode to a size of the image in the input image data is maintained in the printing image data.

5. A printing apparatus comprising:

an image processing device according to claim 1; and a printing unit configured to perform printing by using print data that is generated from the printing image data with the widths of the plurality of elements of the barcode corrected, and that represents presence or absence of dot formation during printing.

6. An image processing method for generating printing image data used during printing from input image data including a barcode constituted by a bar element and a space element that are a plurality of elements arranged based on a predetermined standard, the image processing method comprising:

acquiring widths of the plurality of elements of the barcode respectively to calculate a frequency distribution of the widths of the plurality of elements;

determining standard widths of the plurality of elements of the barcode in the printing image data using the frequency distribution, the plurality of elements including a plurality of wide elements, and a plurality of narrow elements each of which has a width that is narrower than a width of each of the wide elements, the standard widths including a standard width for the plurality of wide elements and a standard width for the plurality of narrow elements;

determining whether the standard widths that have been determined match the predetermined standard that defines a width ratio relationship between the standard width for the plurality of wide elements and the standard width for the plurality of narrow elements; and correcting the widths of the plurality of elements of the barcode in the printing image data to the standard widths upon determining that the standard widths match the predetermined standard.

\* \* \* \* \*